(12) United States Patent
Offermann

(10) Patent No.: US 7,512,651 B2
(45) Date of Patent: Mar. 31, 2009

(54) SECURELY PASSING USER CREDENTIALS FOR ACCESS TO AN APPLICATION THROUGH A NETWORK PORTAL

(75) Inventor: Udo Offermann, Nussloch (DE)

(73) Assignee: SAP AG, Walldorf (DE)

( * ) Notice: Subject to any disclaimer, the term of this patent is extended or adjusted under 35 U.S.C. 154(b) by 735 days.

(21) Appl. No.: 10/325,652

(22) Filed: Dec. 20, 2002

(65) Prior Publication Data
US 2004/0123148 A1 Jun. 24, 2004

(51) Int. Cl.
*G06F 15/16* (2006.01)
(52) U.S. Cl. .................. 709/203; 709/217; 709/229
(58) Field of Classification Search .......... 709/203, 709/223
See application file for complete search history.

(56) References Cited
U.S. PATENT DOCUMENTS

| | | | |
|---|---|---|---|
| 6,389,421 B1 * | 5/2002 | Hawkins et al. ............... 707/10 |
| 6,523,022 B1 * | 2/2003 | Hobbs ............................ 707/3 |
| 7,093,279 B2 * | 8/2006 | Tretheway et al. ............. 726/3 |
| 2002/0010757 A1 * | 1/2002 | Granik et al. ................ 709/218 |
| 2003/0061512 A1 * | 3/2003 | Flurry et al. ................. 713/201 |
| 2004/0111530 A1 * | 6/2004 | Sidman ....................... 709/245 |

OTHER PUBLICATIONS

Fielding et al., "Hypertext Transfer Protocl -HTTP/1.1", pp. 1-114, The Internet Society (1999).

* cited by examiner

*Primary Examiner*—Patrice Winder
*Assistant Examiner*—Azizul Choudhury
(74) *Attorney, Agent, or Firm*—Mintz, Levin, Cohn, Ferris, Glovsky and Popeo P.C.

(57) ABSTRACT

Systems and techniques to enable access of an application through a network portal to integrate that network application into the portal services provided to a user. In general, in one implementation, the technique includes generating a network address including user credentials in a query portion of the network address. The technique also includes generating an encrypted network request using a command which causes a network server to not log the query portion of the network address and causing a redirect at a network browser after employing the network address in the network request.

30 Claims, 5 Drawing Sheets

100

SECURELY PASSING USER CREDENTIALS FOR ACCESS TO AN APPLICATION THROUGH A NETWORK PORTAL

The following relates to flexibly integrating applications, for example, enabling access of an application through a network portal.

BACKGROUND

A user can use a browser to access content distributed on networks, such as the Internet. A user typically accesses the network with a client device that runs the browser. The browser uses a network resource indicator, such as a universal resource locater ("URL"), to find and access desired content. The browser sends a request to a web server and receives back a response, typically an HTML file, for display on the client. The user can also use a URL to launch an application hosted by the web server that is available over a network.

A portal is a network resource that serves as a gateway and/or anchor point for a user. The portal provides information about the network and/or network services to the user. Services offered by a portal can include a network directory, a facility to search for other network resources, and the display of content, such as news, weather information, schedules, stock quotes and the like, from other network resources. An enterprise information portal is a type of portal that serves as a gateway to resources on an enterprise's network. For example, a corporation may have a corporate portal to access the company's information and knowledge base. The corporate portal can be accessible to employees, customers, business partners, and/or the general public. Portals can be customized and/or personalized. For example, the portal can determine the particular content (e.g., certain portions of a data source) that is displayed and/or how that content is displayed. The portal can base this determination on the user, the client, and/or the requested content.

SUMMARY

The present application teaches enabling access of an application through a network portal. In one aspect, there is a method that includes identifying, with a template, a correspondence between a first parameter associated with a portal and a second parameter associated with a network resource and generating, using the template, a network address for the network resource, the network address including a value for the first parameter. In other examples, the method can further include parsing the template, identifying the first parameter and determining the value for the first parameter. The method can also include identifying a third parameter associated with the portal, determining a second value for the third parameter, and inserting the second value into the network address. Inserting can include concatenating.

The method can also include determining the value for the first parameter based on a user, a client device, and/or the portal. The method can include copying the template, determining the value for the first parameter, and replacing the first parameter with the value. The method can include transmitting the network address to a network browser. The method can include transmitting the network address to a network browser as part of source code.

The method can include generating a portion of a display associated with the portal using the source code. The parameters can include a transaction code, a client definition, an accessibility requirement, a style definition, and/or user credentials. The format of the template can include a Uniform Resource Locator ("URL") format. The format of the template can also include a URL format in accord with http.

In another aspect, there is a method including generating a template for use by a network portal, the template being associated with a network application and including a correspondence between a first parameter associated with the network portal and a second parameter associated with the network application. In other examples, the method can include transmitting the template to the network portal. The parameters can include a transaction code, a client definition, an accessibility requirement, a style definition, and/or user credentials. The network application can be a backend application. The format of the template can include a URL format. The format of the template can also include a URL format in accord with http.

In another aspect, there is a system including a storage component and an integration component. The storage component has a template including a correspondence between a first parameter associated with a portal and a second parameter associated with a network resource. The integration component is configured to use the template to generate a network address for the network resource wherein the network address includes a value for the first parameter.

The integration component can be further configured to parse the template, to identify the first parameter and to determine the value for the first parameter. The value can be a first value and the integration component can be further configured to identify a third parameter associated with the portal, to determine a second value for the third parameter, and to insert the second value into the network address. The integration component can be further configured to concatenate the first value and the second value.

The value for the parameters can be based on a user, a client device, and/or the portal. The integration component can be further configured to copy the template, to determine the value for the first parameter, and to replace the first parameter with the value. The integration component can be further configured to transmit the network address to a network browser. The integration component can be further configured to transmit the network address to a network browser as part of source code.

The system can also include a client configured to generate a portion of a display associated with the portal using the source code. The parameters can include a transaction code, a client definition, an accessibility requirement, a style definition, and/or user credentials. The format of the template can include a URL format. The format of the template can also include a URL format in accord with http.

In another aspect, there is a method including generating a network address including user credentials in a query portion of the network address and generating source code to cause an encrypted network request using a command that causes a network server to not log the query portion of the network address. In other examples, the method can include transmitting the network address and the source code to the network browser.

The network address can be a first network address, and the method can further include generating a second network address associated with a redirect request and transmitting the first network address to a browser in response to the redirect request. The redirect request can include an identifier. The method can include generating replacement source code in response to the redirect. The method can include generating source code to cause an encrypted network request in accord with hypertext transfer protocol over secure socket layer ("https") and/or in accord with secure hypertext transfer protocol ("s-http").

The method can include generating source code to cause a terminal emulator connection between the network browser and a computing device hosting a requested resource. The method can include generating source code including an applet. The method can include identifying, with a template, a correspondence between a first parameter associated with a portal and a second parameter associated with a network resource. The method can include using the template to generate the network address.

The command can include an http POST command. The network address can include a uniform resource locator ("URL"). The source code can include hypertext markup language ("HTML") and/or extensible markup language ("XML").

In another aspect, there is a method including generating a network address including user credentials in a query portion of the network address and generating an encrypted network request using a command that causes a network server to not log the query portion of the network address. In other examples, the method can include transmitting the network address and the source code to the network browser.

The network address can be a first network address, and the method can include generating a second network address associated with a redirect request and transmitting the first network address to a browser in response to the redirect request. The redirect request can include an identifier. The method can include generating replacement source code in response to the redirect request. The method can include transmitting the encrypted network request over a network in accord with https and/or in accord with s-http.

The method can include establishing a terminal emulator connection between the network browser and a computing device hosting a requested resource. The method can include employing an applet. The method can include identifying, with a template, a correspondence between a first parameter associated with a portal and a second parameter associated with a network resource. The method can include generating the network address further comprises employing a template. The command can include a POST command. The network address can include a URL. The source code can include HTML and/or XML.

In another aspect, there is a system including an integration component. The integration component is configured to generate source code in response to a request. The source code includes a network address, a first portion, and a second portion. The network address has user credentials in a query portion of the network address. The first portion causes a network browser to generate an encrypted network request using a command that causes a network server to not log the query portion of the network address. The second portion causes a redirect at a network browser.

In other examples, the integration component is further configured to transmit the source code to the network browser. The network address can be a first network address, and the source code can also include a second network address associated with a network portal for the redirect. The redirect can include an identifier. The integration component can be further configured to generate replacement source code in response to the redirect. The encrypted network request can be in accord with https and/or s-http.

The system of claim 1 further comprising generating source code to cause a telnet connection between the network browser and a computing device hosting a requested resource. The integration component can be further configured to generate additional source code to cause a telnet connection further comprises generating source code comprising an applet. The integration component can be further configured to identify, with a template, a correspondence between a first parameter associated with a portal and a second parameter associated with a network resource. The integration component can be further configured to employing the template. The command can include a POST command. The network address can include a URL. The source code can include HTML and/or XML. The system can also include a client having the network browser.

In another aspect, there are one or more articles comprising a machine-readable medium storing instructions operable to cause one or more machines to perform any combination of the method operations described above.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to enabling a browser to pass user-specific and/or portal-specific values for certain parameters to a desired network application launched using a uniform resource indicator ("URI"). In general, when a portal receives a request for a desired network application from a client, the portal employs a template, as described in more detail below, that includes parameters associated with that desired network application. The portal obtains user-specific and/or portal-specific values for the template parameters and generates a URL with those specific values to launch the network application. The portal transmits the generated URL to the client so that the client can launch the application. By passing user-specific and/or portal-specific data to the network application, the output of the application appears on the client as an integral part of the client's portal display.

Figure 1:
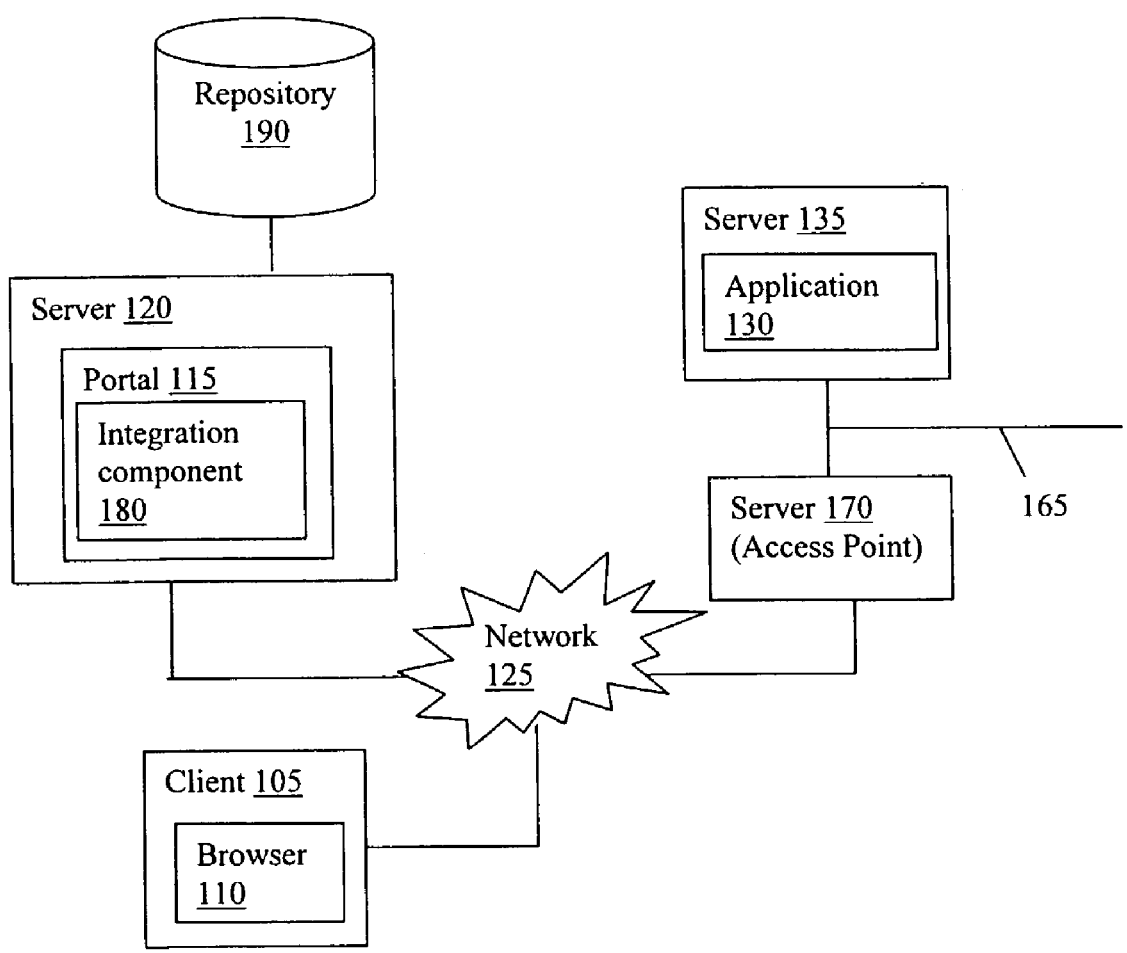
FIG. 1 shows a block diagram of a communication network including a portal.

FIG. 1 illustrates a communication network 100. Communication network 100 represents a network of a corporate enterprise. A user (e.g., employee) employs a client 105 to access resources (e.g., corporate data, corporate applications, Internet resources) using network 100. Client 105 executes a browser application 110 to access and interface with the network resources. Browser 110 initially communicates with corporate portal 115, executing on server 120, via the network 125. Network 125 can be, for example the Internet, the enterprise intranet, and the like. Portal 115 generates and transmits an initial page to client 105.

Figure 2:
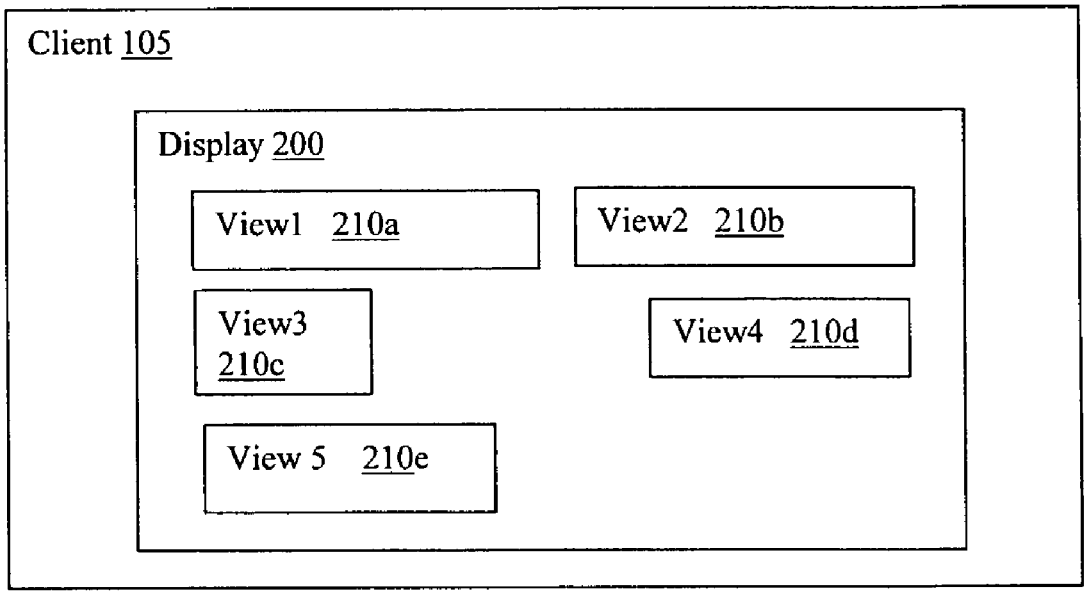
FIG. 2 shows a block diagram of a client display including a plurality of views through a portal.

FIG. 2 illustrates client 105 displaying a page received from portal 115 (FIG. 1). Client 105 includes a display 200 having several portions 210a, 210b, 210c, 210d, and 210e, generally 210. These portions 210, also referred to as views 210, each display data to a user of client 105. A view 210 is a graphical user interface that displays data in a frame located at a predetermined location within display 200. For example, view 210a can display a user's calendar, view 210b can display a user's email account, view 210c can display a pie chart of the corporation's sales, view 210d can display a pie chart of the user's department's sales, and view 210e can display financial information, such as stock price, for companies that the user has selected. The data displayed in each of the views 210 can be from different sources. Additionally, a single view (e.g., 210a) can display data from more than one source. A view 210 can also display output produced by a network application executing on a different server (i.e., not client computer 105 or server 120 (FIG. 1) executing portal application 115).

Even though the data displayed may come from disparate sources, a service portal 115 provides coordinating and customizing views 210 so that the views 210 have a consistent and personalized look and feel ("LAF") for the user. For example, portal 115 can coordinate colors and fonts so that everyone using the corporate portal sees the same coordinated views according to the corporate layout. Portal 115 can coordinate the location of the views 210 by defining the frames for each view 210 in which client 105 displays the associated data. Portal 115 can define the size and location of the frame and can provide to browser 110 a network address, such as a URL, from which browser 110 can retrieve data to display in the defined frame.

Portal 115 can also coordinate the LAF of views 210 based on the type of computing device client 105 comprises. For example, if a user accesses network 100 (FIG. 1) employing a handheld computing device (e.g., personal digital assistant, wireless phone), portal 115 can alter the views to accommodate the smaller display 200 of such handheld devices. Portal 115 can also maintain and/or have access to user management information so that the views can be personalized based on the user. For example, this information can be stored in repository 190, to which portal 115 has access. This allows, for example, portal 115 to provide screen accessibility services to be compliant with Section 508 of the Rehabilitation Act Amendments of 1998. This also allows portal 115 to determine content and/or LAF of views 21 based on the role the user has with respect to the corporation. Views 210 can be based on whether the user is an employee, a business partner, or a customer.

In addition to user management information, portal 115 also maintains and/or has access to system landscape information. This enables portal 115 to access information regarding the systems and architecture, such as protocols, access points, and URIs, containing the network resources in which a user is interested. For example, this information can be stored in repository 190, to which portal 115 has access. This also allows portal 115 to combine the user management information with the system landscape information to provide single sign-on ("SSO") services to a user. With SSO, once portal 115 authenticates a user, portal 115 provides the user credentials to the disparate data sources for views 210, determining which user credentials are needed for which network resources requested. The user no longer performs individual authentication at each of the individual sources. Portal 115 can obtain the necessary user credentials for a desired network resource based on the user management information and the system landscape information. As described in more detail below, portal 115 can securely pass the user credentials to a network resource in an automated process.

Referring back to FIG. 1, in network 100, client 105 can access network application 130 executing on server 135. As illustrated, network application 130 is available through a back-end network 165 via a Web server 170. Web server 170 serves as an access point to application 130 for client 105, which is communicating with Web server 170 via network 125. To integrate this background application 130 (e.g., an application hosted by a backend system) into the display 200 (FIG. 2), portal 115 includes an integration component 180. To launch a network application 130 and display the output produced by application 130 in a view 210, integration component 180 generates a URL.

Figure 3:
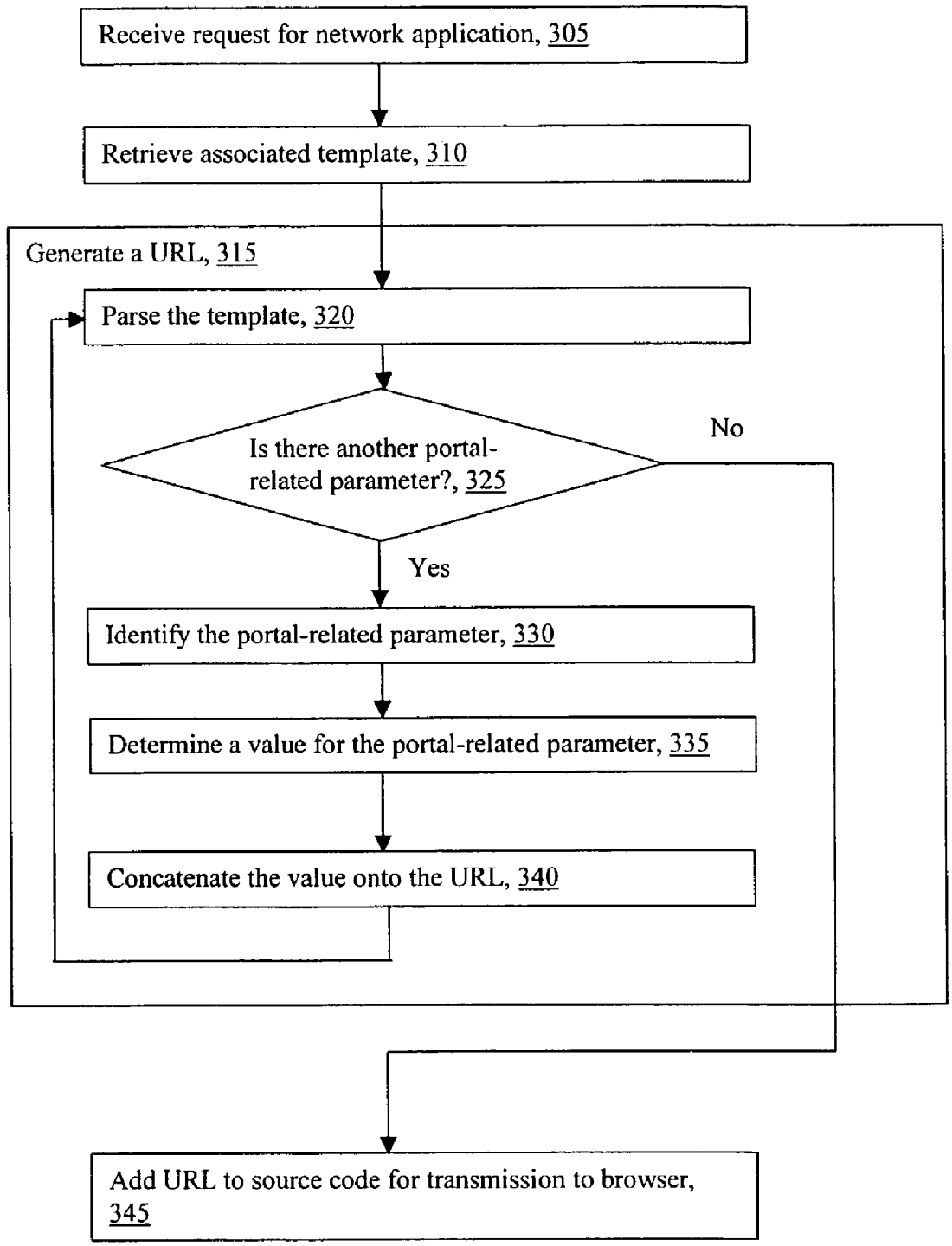
FIG. 3 is a flowchart showing a process for generating a URL.

FIG. 3 illustrates a process 300 of generating a URL in more detail. Integration component 180 (FIG. 1) receives 305 a request to launch network application 130 (FIG. 1). The request 305 can be via a hyperlink in a view 210. Alternatively, the request 305 can come from a view 210 that a user defines and initiates via a view development tool. In response to the request, integration component 180 retrieves 310 a template associated with network application 130. The template has the format "<system.access_point.protocol>:// <system.access_point.host>/
<system.access_point.path>/
webgui?~transaction=<TCode> &~client=<system.client>
&~accessibility=<user.accessibility> &~style=<LAF.style>&~...
&~authentication=<user.user_credentials>".

The template follows the general format of a URL for a system employing hypertext transfer protocol ("HTTP"), which is "http://host_port/path/service?querystring". In the template, the "<xxx>" represents the portal-related parameters for which integration component 180 obtains values when generating the URL. The "~" symbol represents those parameters defined by the target system (e.g., server 135 (FIG. 1) and/or application 130). The "~" symbol is used in a specific vendors system and other systems can have different preceding symbols to represent a system parameter or can have no special preceding symbol. These are the resource-related parameters. The template maps the portal-related parameters to the resource-related parameters and enables portal 115 to pass portal-related data to the network resource. Someone who has knowledge of both portal-related parameters and resource-related parameters generates the template. This can be, for example, an administrator of communication network 100 (FIG. 1) or a programmer of a network application.

Continuing with FIG. 3, integration component 180 generates 315 a URL using the template. Integration component 180 parses 320 the template to determine 325 whether there is a portal-related parameter in the template that integration component 180 has not yet processed. If there is a portal-related parameter, integration component 180 identifies 330 the parameter. In the example template, integration component 180 determines 325 there is a portal-related parameter and identifies 330 the parameter as "<system.access_point-.protocol>." Integration component 180 determines 335 that the values for this protocol parameter can be http, https, and s-http. As described above, integration component 180, as part of portal 115, has access to the system landscape information for network 100. For example, system landscape information can be part of a database with network resource information that indicates that application 130 executes on server 135 and is available through access point 170 using http. Alternatively, integration component 180 can query access point 170 to determine allowable protocols.

Integration component 180 selects the value https so that the URL, which will contain user credentials, is passed securely (e.g., encrypted) to the access point, as described in more detail below. Integration component 180 concatenates 340 the value of the parameter to the URL. Because this is the first parameter, its value is the first element of the concatenation. The concatenation starts as "https". Integration component 180 continues to parse 320 the template to determine 325 whether there is another portal-related parameter remaining in the template that integration component 180 has not yet processed. While parsing the template, integration component 180 further generates the URL by concatenating those elements of the template that are not portal-related parameters. The URL becomes "https://" when integration component 180 identifies 330 the next portal-related parameter <system.access_point.host>. Similarly as described above, integration component 180 determines 335 a value for this next parameter and concatenates this value to the URL. These actions 320, 325, 330, 335, and 340, continue until integration component 180 determines 335 values for all of the portal-related parameters of the template and generates 315 a complete URL. Using the example template, integration component 180 can generate a complete URL as follows:

https://server_135/Application_Related_Path/
        webgui?~transaction=SW04&~client=
        050&~accessibility=true&~style=
        jsmith1.css&~ . . . &~authentication=
        (jsmith, password)

As described above, integration component 180 defines a frame for a view 210 (FIG. 2) and generates source code (e.g., HTML) that enables browser 110 to render the frame. Integration component 180 adds 345 the complete URL to the source code so that browser 110 can launch application 130 and display the output of application 130 in the defined frame. The complete URL of the example includes user credentials (e.g., a username and a password) in the query portion of the URL. When the URL travels through network 125, using https, the URL is encrypted and so the user credentials are secure. However, when the URL is at client 105 and when Web server 170 decrypts the URL, the URL, along with the user credentials, is exposed and has the potential to be discovered by another party. To minimize and eliminate this potential, integration component 180 includes two aspects with the source code. The first aspect is the use of a redirect. The redirect causes browser 115 to replace the source code containing the user credentials with source code without the user credentials immediately after browser 115 makes a request with the URL. The second aspect is the use of a "post" command with the URL. The use of a "post" command causes Web server 170 to log the portion of the URL preceding the query string and to not log the information (e.g., user credentials) in the query portion of the URL.

Figure 4A:
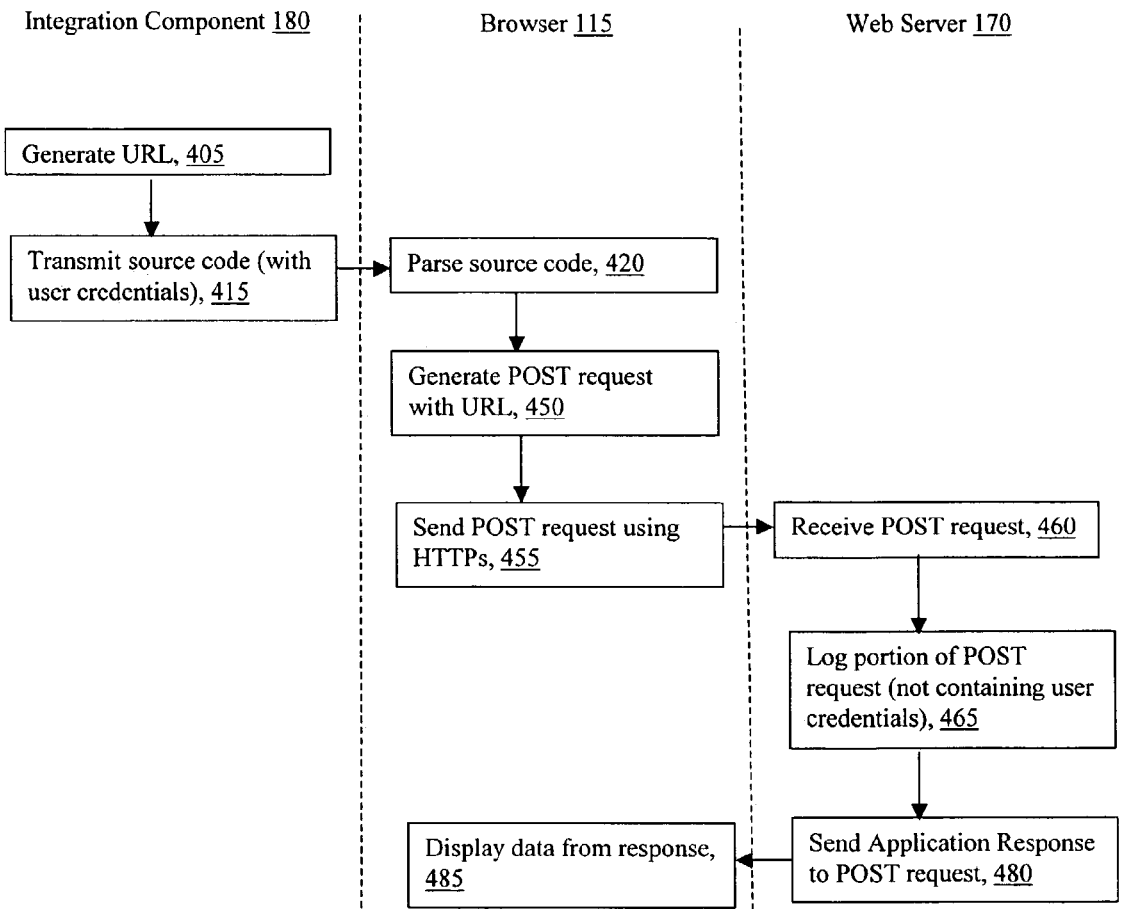
FIG. 4A is a flowchart showing a process for securely passing using credentials, via a URL, in an existing frame.
Figure 4B:
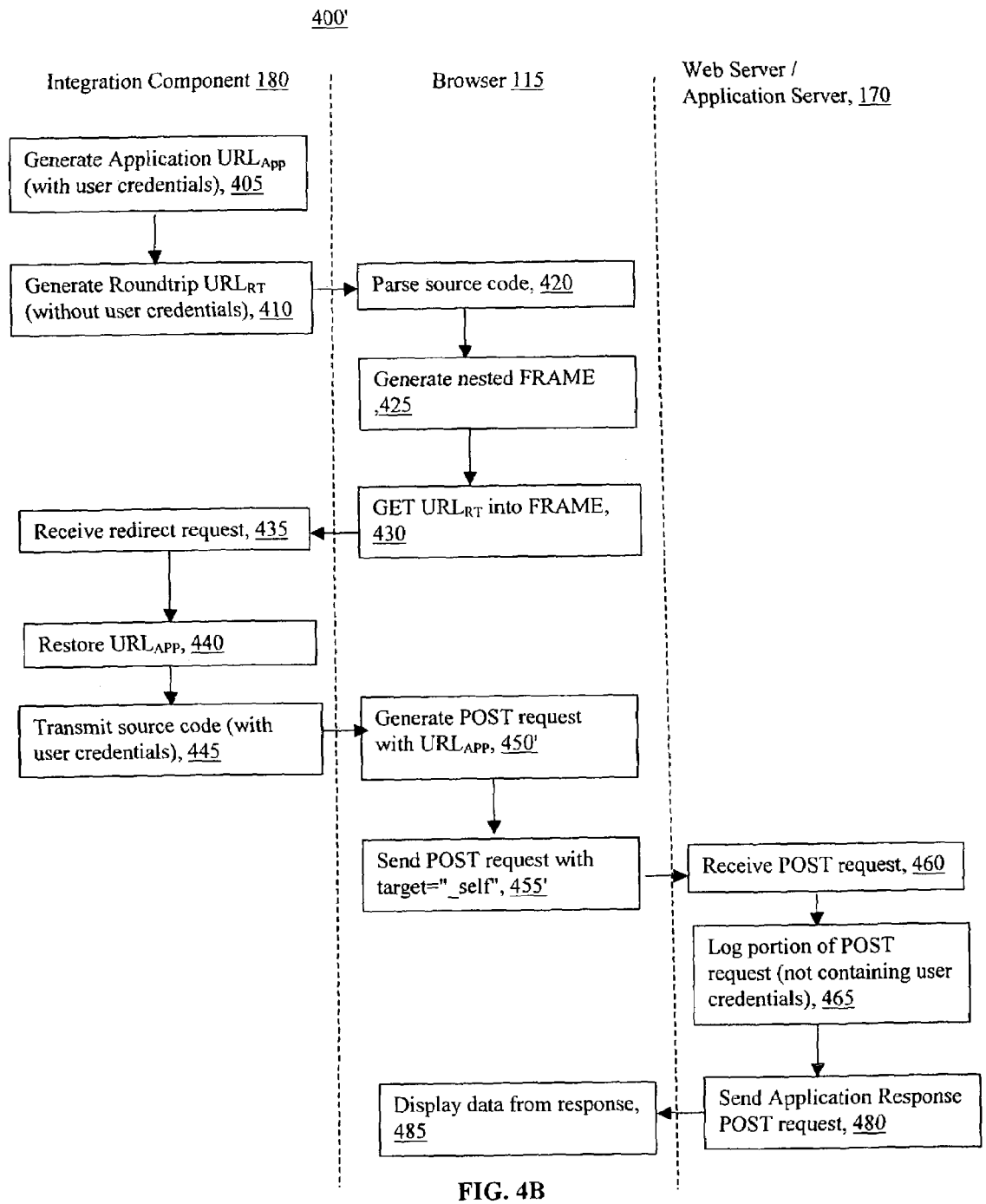
FIG. 4B is a flowchart showing a process for securely passing using credentials, via a URL, in a new frame.

FIGS. 4A and 4B illustrate processes 400 and 400', respectively, that employ one or both of these aspects. More specifically, process 400 does not include a redirect and process 401' does include a redirect. Integration component 180 employs process 400 when a frame exists into which application output can be rendered, and a redirect is not needed if the frame (e.g., for a view 210) exists. If the frame view does yet not exist in display 200, integration component 180 generates source code (e.g., html) to render the frame (e.g., for a view 210). Because this source code to generate a frame will be available in a browser 110, via view source, as long as the frame is rendered, a URL (with the user credentials) in this source code would also be available. Thus integration component 180 uses the redirect in process 400' to have browser 115 render the frame and then go back to integration component 180 to retrieve the URL$_{APP}$ (with the user credentials) and use that URL$_{APP}$ to retrieve the content to display within the frame.

Referring to FIG. 4A, integration component 180 generates (405) a URL, with user credentials, indicating the source of data to be rendered in an existing view 210 and adds the URL to the source code. Integration component 180 transmits (415) the source code to browser 115 to enable browser 115 to render output produced from the application indicated in the URL within the existing view 210. Browser 115 parses (420) the source code. In response to the code, browser 115 generates (450) a POST request using the URL with the user credentials. Browser 115 transmits (455) the POST request to the Web server 170 over network 125. As described above, communication between browser 115 and Web server 170 conforms to https, so that the user credentials in the URL are encrypted and not discoverable while the request is in transit over network 125.

Web server 170 receives (460) the POST request. Web server 170 logs (465) a portion of the POST request, but does not log the query portion of the request including the user credentials because browser 115 employs a POST command. The query portion of the URL in a POST request is part of the request body and hidden from the Web server 170. Web server 170 receives the response to the request generated by server 135 and forwards (480) the response to browser 115. Browser 115 receives the response and displays (485) data from the response in the appropriate existing view 210.

Referring to FIG. 4B, integration component 180 generates (405) a URL$_{APP}$, with user credentials, indicating the source of data to be rendered in a view 210 that must be generated. If integration component 180 determines that a view 210 does not currently exist in portal display 200, integration component 180 also generates a URL$_{RT}$ to redirect the browser 115 back to integration component 180 after browser 115 generates a view 210 in which the URL$_{APP}$ source is displayed (485). URL$_{RT}$ points back to the integration component. The roundtrip URL$_{RT}$ doesn't contain any user credentials but only a roundtrip key that is valid only for one roundtrip. The information that is needed to compute the application URL$_{APP}$ (including user credentials) is saved in portal 115 using this key so that the integration component 180 can resume the process to compute the application URL (URL$_{APP}$)

The Integration component 180 adds the URL$_{RT}$ to the source code to generate view 210 and transmits this source code to browser 115. Integration component 180 transmits (415) the source code to browser 115. Browser 115 parses (420) the source code and generates (425) a frame for view 210 in which data is displayed (485). With the frame rendered, browser 115 refers to URL$_{RT}$ for the source. In response to the URL$_{RT}$, browser 115 performs a redirect back to integration component 180. Integration component 180 receives (435) the redirect request and restores (440) the URL$_{APP}$, including user credentials, based on the identifier in the URL$_{RT}$. Integration component 180 transmits (445) the source code with the URL$_{APP}$ to browser 115 for processing.

The result of the roundtrip URL is the same as the result of the existing view 210 case of process 400. The redirect response generates (450') a POST request that points to the remote application and replaces itself in order to obscure the user credentials. Browser 115 transmits (455') the POST request, with target="_self" to the Web server 170 over network 125. As described above, communication between browser 115 and Web server 170 conforms to https, so that the user credentials in the URL are encrypted and not discoverable while the request is in transit over network 125.

Web server 170 receives (460) the POST request. Web server 170 logs (465) a portion of the POST request, but does not log the query portion of the request including the user credentials because browser 115 employs a POST command. The query portion of the URL in a POST request is part of the request body and hidden from the Web server 170. Web server 170 receives the response to the request generated by server 135 and forwards (480) the response to browser 115. Browser 115 receives the response and displays (485) data from the response in the appropriate view 210.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), an intranet, the Internet, and wireless networks, such as a wireless WAN.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. For example, portions of this disclosure discuss a particular format of the template. The structure of the template can change based on the system landscape. For example, if an application is not on a backend network and has no access point, some parameters will change (e.g., <system.protocol>, <system.host>, <system.path>). If a system with a desired resource employs a different network protocol, the format of the template is adjusted to comply with the format of that different network protocol. As another alternative, the source code transmitted to the browser can include a JAVA applet that utilizes a telnet client to communicate with the backend resource.

Additionally, the logic flows depicted in FIGS. 3 and 4 do not require the particular order shown, or sequential order, to achieve desirable results. For example the repeating of actions 320, 325, 330, and 335 may be performed in parallel instead of in series by the order in which the parameters appear. In certain implementations, multitasking and parallel processing of the parameters may be preferable. In such a case concatenation can be performed using the template as a guide to order the parallel processes.

Other embodiments may be within the scope of the following claims.

What is claimed is:

1. A method comprising:
   receiving, at a portal server, a request for an application;
   retrieving, at the portal server, a template associated with the application, the template used to generate a network address locating the application at an application server;
   generating, at the portal server, the network address including first user credentials in a query portion of the network address, the network address generated using a template including at least one value specific to a user of the application and at least another value specific to the application, the network address configured, such that when the network address is sent to a browser at a client, the browser launches the application using the at least one value specific to the user of the application and the at least one other value specific to the application;
   generating, at the portal server, source code without including the first user credentials, when the browser does not include a frame to render an output of the application, the source code without the first user credentials configured to redirect the browser to the portal server after generating, using the source code, the frame at the browser, the redirection causing the portal server to restore the network address including first user credentials; and
   transmitting, by the portal server to the browser, the network address including first user credentials to generate, at the browser, a post request to log, at the application server, the query portion and without logging, at the application server, the first user credentials.

2. The method of claim 1 further comprising transmitting the network address and the source code to a network browser.

3. The method of claim 1 wherein the network address is a first network address, the method further comprising:
   generating a second network address associated with a redirect request; and
   transmitting the first network address to a browser in response to the redirect request.

4. The method of claim 3 wherein the redirect request comprises an identifier.

5. The method of claim 3 further comprising generating replacement source code in response to the redirect.

6. The method of claim 1 further comprising: generating source code to cause an encrypted network request in accord with hypertext transfer protocol over secure socket layer ("https") or in accord with secure hypertext transfer protocol ("s-http").

7. The method of claim 1 further comprising generating source code to cause a terminal emulator connection between a network browser and a computing device hosting a requested resource.

8. The method of claim 7 wherein generating source code to cause a terminal emulator connection further comprises generating source code including an applet.

9. The method of claim 1 further comprising identifying, with a template, a correspondence between a first parameter associated with a portal and a second parameter associated with a network resource.

10. The method of claim 9 wherein generating the network address further comprises using the template to generate the network address.

11. The method of claim 1 wherein the first command comprises an http POST command.

12. The method of claim 1 wherein the network address comprises a uniform resource locator ("URL") and the first user credentials comprise an account name and password to authenticate the user for a service.

13. The method of claim 1 wherein the source code comprises hypertext markup language ("HTML") or extensible markup language ("XML").

14. The method of claim 1, further comprising:
 interpreting, at the portal server, a template for access to a service, the template comprising a first parameter for a service address and a second parameter for user credentials;
 and, wherein the generating the network address comprises replacing the first parameter with the service address and replacing the second parameter with the first user credentials in accordance with the template, the replacing to generate the network address including the first user credentials in the query portion of the network address.

15. A system comprising:
 a processor; and
 a memory, wherein the processor and the memory are configured to provide a method comprising:
  receiving, at an integration component at a portal server, a request for an application;
  retrieving, at the integration component at the portal server, a template associated with the application, the template used to generate a network address locating the application at an application server;
  generating, at the integration component at the portal server, a network address including first user credentials in a query portion of the network address, the network address generated using a template including at least one value specific to a user of the application and at least another value specific to the application, the network address configured, such that when the network address is sent to a browser at a client, the browser launches the application using the at least one value specific to the user of the application and the at least one other value specific to the application;
  generating, at the integration component at the portal server, source code without including the first user credentials, when the browser does not include a frame to render an output of the application, the source code without the first user credentials configured to redirect the browser to the portal server after generating, using the source code, the frame at the browser, the redirection causing the portal server to restore the network address including first user credentials; and
  transmitting, by the portal server to the browser, the network address including first user credentials to generate, at the browser, a post request to log, at the application server, the query portion and without logging, at the application server, the first user credentials.

16. The system of claim 15 wherein the integration component is further configured to transmit the source code to the network browser.

17. The system of claim 15 wherein the network address is a first network address, the source code further comprising a second network address associated with a network portal for the redirect.

18. The system of claim 17 wherein the redirect comprises an identifier.

19. The system of claim 15 wherein the integration component is further configured to generate replacement source code in response to the redirect.

20. The system of claim 15 wherein the encrypted network request is in accord with https or in accord with s-http.

21. The system of claim 15 wherein the integration component is further configured to generate source code to cause a terminal emulation connection between the network browser and a computing device hosting a requested resource.

22. The system of claim 21 wherein the integration component is further configured to generate source code to cause a terminal emulation using an applet.

23. The system of claim 15 wherein the integration component is further configured to identify, with a template, a correspondence between a first parameter associated with a portal and a second parameter associated with a network resource.

24. The system of claim 23 wherein the integration component is further configured to generate the network address employing the template.

25. The system of claim 15 wherein the first command comprises a POST command.

26. The system of claim 15 wherein the network address comprises a URL.

27. The system of claim 15 wherein the source code comprises HTML or XML.

28. The system of claim 15 further comprising a client including the network browser.

29. An article comprising a machine-readable medium storing instructions operable to cause one or more machines to perform operations comprising:
 receiving, at an integration component at a portal server, a request for an application;
 retrieving, at the integration component at the portal server, a template associated with the application, the template used to generate a network address locating the application at an application server;
 generating, at the integration component at the portal server, the network address including first user credentials in a query portion of the network address, the network address generated using a template including at least one value specific to a user of the application and at least another value specific to the application, the network address configured, such that when the network address is sent to a browser at a client, the browser launches the application using the at least one value specific to the user of the application and the at least one other value specific to the application;
 generating, at the integration component at the portal server, source code without including the first user credentials, when the browser does not include a frame to render an output of the application, the source code without the first user credentials configured to redirect the browser to the portal server after generating, using the source code, the frame at the browser, the redirection causing the portal server to restore the network address including first user credentials; and
 transmitting, by the portal server to the browser, the network address including first user credentials to generate, at the browser, a cost request to log, at the application server, the query portion and without logging, at the application server, the first user credentials.

30. The article of claim 29 further comprising a machine-readable medium storing instructions operable to cause one or more machines to perform operations comprising:
 generating a second network address associated with a redirect request; and
 transmitting the first network address to a browser in response to the redirect request.

* * * * *